US010011530B2

(12) United States Patent
Ihsan et al.

(10) Patent No.: US 10,011,530 B2
(45) Date of Patent: Jul. 3, 2018

(54) GEOPOLYMER COATING AND MORTAR

(71) Applicant: ALSITEK LIMITED, Peterborough, Cambridgeshire (GB)

(72) Inventors: Harun Ihsan, Peterborough (GB); Uzair Bapu, Blackburn (GB); Michael Reid, Peterborough (GB)

(73) Assignee: ALSITEK LIMITED, Peterborough (GB)

( * ) Notice: Subject to any disclaimer, the term of this patent is extended or adjusted under 35 U.S.C. 154(b) by 0 days.

(21) Appl. No.: 15/500,225

(22) PCT Filed: Jul. 30, 2015

(86) PCT No.: PCT/EP2015/067545
§ 371 (c)(1),
(2) Date: Jan. 30, 2017

(87) PCT Pub. No.: WO2016/016385
PCT Pub. Date: Feb. 4, 2016

(65) Prior Publication Data
US 2017/0240470 A1    Aug. 24, 2017

(30) Foreign Application Priority Data

Jul. 30, 2014 (GB) .................................. 1413523.0
Oct. 23, 2014 (GB) .................................. 1418830.4

(51) Int. Cl.
| | |
|---|---|
| C09D 1/02 | (2006.01) |
| C04B 28/00 | (2006.01) |
| C04B 22/06 | (2006.01) |
| C04B 38/02 | (2006.01) |
| C04B 38/00 | (2006.01) |
| C09D 5/18 | (2006.01) |
| C09D 1/06 | (2006.01) |
| C04B 103/42 | (2006.01) |
| C04B 111/00 | (2006.01) |
| C04B 111/28 | (2006.01) |

(52) U.S. Cl.
CPC .......... C04B 28/006 (2013.01); C04B 22/062 (2013.01); C04B 38/0067 (2013.01); C04B 38/02 (2013.01); C09D 1/02 (2013.01); C09D 1/06 (2013.01); C09D 5/18 (2013.01); C04B 2103/42 (2013.01); C04B 2111/00508 (2013.01); C04B 2111/28 (2013.01); C04B 2201/20 (2013.01)

(58) Field of Classification Search
CPC ..... C04B 28/006; C04B 22/062; C04B 38/02; C04B 38/0067; C04B 2103/42; C04B 2111/00508; C04B 2201/20; C04B 2111/28; C09D 1/02; C09D 1/06; C09D 5/18
See application file for complete search history.

(56) References Cited

U.S. PATENT DOCUMENTS

| | | | |
|---|---|---|---|
| 8,057,594 B2 * | 11/2011 | Doyoyo | ................. C04B 26/32 106/677 |
| 2004/0182285 A1 | 9/2004 | Mazany et al. | |
| 2015/0239148 A1 * | 8/2015 | Israel | .................... B33Y 10/00 264/40.3 |

FOREIGN PATENT DOCUMENTS

| | | | | |
|---|---|---|---|---|
| DE | 4107430 A1 | * | 9/1992 | ........... C04B 28/006 |
| DE | 4108644 A1 | * | 9/1992 | ............... E04B 1/74 |
| DE | 9402266 U1 | | 4/1994 | |
| EP | 2644583 A1 | | 10/2013 | |
| EP | 2868637 A1 | | 5/2015 | |
| FR | 2512805 A1 | | 3/1983 | |
| KR | 10-1140102 B1 | * | 4/2012 | |
| KR | 10-1370976 B1 | * | 3/2014 | |
| WO | 9725291 A2 | | 7/1997 | |
| WO | 2004/076378 A1 | | 9/2004 | |
| WO | 2008/113609 A2 | | 9/2008 | |
| WO | 2014/166998 A1 | | 10/2014 | |

OTHER PUBLICATIONS

Machine Translation of WO 2004/076378 A1 (Sep. 2004).*
International Search Report and Written Opinion, International Searching Authority, Application No. PCT/EP20151067545, dated Oct. 19, 2015, 12 pages.
International Preliminary Report on Patentability, issued by the International Preliminary Examining Authority, Application No. PCT/EP2015/067545 dated Oct. 25, 2016, 31 pages.
Combined Search and Examination Report, issued by the Intellectual Property Office, Application No. GB1413523.0, dated Jan. 28, 2015, 6 pages.
Temuujin, Jadambaa et al. "Thermal properties of spray-coated geopolymer-type compositions." Journal of thermal analysis and calorimetry 107.1 (2012): 287-292.

* cited by examiner

*Primary Examiner* — Anthony J Green
(74) *Attorney, Agent, or Firm* — Meunier Carlin & Curfman LLC

(57) ABSTRACT

Use of a geopolymer in a coating composition for a building construction component, a coated component for use in building construction wherein the coating comprises a geopolymer, a method of coating a component comprising applying a curable geopolymer mixture to a surface of the component and curing the mixture to form a cured geopolymer coating, and the use of a geopolymer as a mortar.

4 Claims, 3 Drawing Sheets

GEOPOLYMER COATING AND MORTAR

The present invention generally relates to geopolymers with fire- and heat-resistant properties. In particular, the present invention relates to uses of a geopolymer, components coated with a geopolymer and methods of coating components with a geopolymer. Alternatively geopolymer is used as a binder for fire resistant insulating material to resist fire as a coating or mortar for components.

Fire protection is an important and even essential aspect in the building construction sector. This can include the use of fire- and heat-resistant materials for the components of a building, as well as the incorporation of other fire safety systems, such as fire detection and extinguishing devices.

Metallic and non-metallic components of a building which may be a door frame, window frame, utility (e.g., electricity or communications) conduit, water or gas pipe, or support beam or column are often coated with a fire- or heat-resistant material to help reduce damage to the component in the event of a fire in the building.

Coating technologies which presently address this need include (i) the use of intumescent coatings or (ii) the use of spray-on mineral fibre coatings applied to the component at the construction stage or in a pre-fabricated manner.

An intumescent material is a material that expands to form a foam upon exposure to heat (e.g., from a fire) due to the presence of a heat-activated blowing (foaming) agent present in the material. The foam then chars with increasing heat, and with the char being a poor conductor of heat, this retards heat transfer from the fire source to the intumescently-coated component.

However, a disadvantage of the use of intumescent materials as coatings is that by the time the intumescent coating has become effective upon expansion and char formation, the coated component may have already warmed considerably towards the temperature at which it will begin to lose its structural strength because of the fire's heating effects from around 400° C. and above (see FIG. 1a). If the heating effects of the fire are not negated rapidly enough, the intumescent coated component may be weakened, which can have drastic consequences for a building structure relying on the structural integrity of the coated component to remain stable and standing.

A graph showing the lower yield strength of plain carbon steel (SA-192) as a function of temperature is shown in FIG. 1b (Nalco Company, 2011). The graph shows that the yield strength and tensile strength of steel rapidly deteriorates at temperatures above 400° C., and has significantly reduced strength above 1000° C. In contrast, the geopolymer according to the present invention may withstand temperatures over 1000° C., and may even withstand temperatures up to 1200° C. whilst still maintaining structural integrity.

Spray-on mineral fibre protection is widely used for structural steel protection and has the advantages of being low cost and also of protecting the steel from the outset of a fire.

However, a disadvantage of this approach is that the fibres are bound to the steel component with a water soluble binder. For application on a building during construction, if there is rain after the fibre is applied and before the building is clad, the fibre can wash off and needs to be re-applied. This can be rain falling on an external part of a building or indeed blowing through the open structure (i.e., pre-clad) of a building under construction.

Additionally, for internal applications, if there are leaks within the building or into the building, the fibre can separate from the steel component, exposing the steel to heat from a fire. The mineral fibres can also be unpleasant and hazardous to work with and result in an unattractive coated product/component which necessitates further covering (e.g., by boarding-in) for aesthetic purposes.

An alternative current method is the spraying on of an ordinary Portland cement (OPC) based foam. Again, this approach is low cost but a disadvantage is that it is not as thermally insulative as other methods and will deteriorate rapidly in a developed fire by spalling.

Currently, OPC is a favoured material for use as a mortar in the construction industry. The disadvantages of using OPC as a mortar, for example when binding bricks, is that it needs to be manually applied using a tool such as a trowel. This is labour-intensive and inefficient process.

Furthermore, OPC comprises ingredients whose manufacture generates substantial amounts of environmentally-unfriendly carbon dioxide gas, which is undesirable.

An increasingly utilised method in this industry is a drymix of OPC and other ingredients that are machine mixed with water and pumped up to where the mixture is needed and applied through a hose to a nozzle. Some variations of drymix include oil based polymers to speed up curing.

However the polymers are not heat resistant and would rapidly deteriorate in the event of a fire. The long term stability and preservation of the integrity of such mortars is also known to be limited.

An alternative approach is the use of very accurate blocks and application to the joint of a thin film of mortar. Such an approach represents a significant dematerialisation but proves difficult to get good reliability of coverage especially in the joint area.

The present invention seeks to ameliorate at least some of the above disadvantages identified in the prior art.

SUMMARY

According to the present invention, there is provided the use of a geopolymer in a coating composition for a building construction component.

Further according to the invention, there is provided a coated component for use in building construction, wherein the coating comprises a geopolymer.

Even further according to the invention, there is provided a method of coating a component comprising applying a curable geopolymer mixture to a surface of the component and curing the mixture to form a cured geopolymer coating.

Additionally, according to the invention, there is provided the use of a geopolymer as a mortar.

Additionally, according to the invention, there is provided a kit of parts for preparing a geopolymer.

SPECIFIC DESCRIPTION

The present invention provides use of a geopolymer in a coating composition for a building construction component.

The present invention provides substantial benefits over the intumescent and spray-on mineral fibre coating approaches of the prior art for several reasons.

The geopolymers, such as those used in accordance with the present invention, have high heat- and fire-resistance, coatings employing the foams retain their integrity upon exposure to temperatures of up to as much as 1200° C.

As can be seen the graph of FIGS. 1a and 1b, between 400 and 1200° C. are the temperatures where steel strength retention factor, yield strength and tensile strength decrease.

Accordingly, a coating material which provides high-temperature resistance such as a geopolymer, will help enable the retention of steel strength in a building component for a longer duration during a fire than for the intumescent material coating. Particularly, if the building component is pivotal to the structure of the building (e.g., a support beam), the presence of such geopolymer coatings will increase the prospects of preventing building collapse prior to a fire being extinguished.

Additionally, the geopolymers used in accordance with the present invention are not susceptible to moisture damage like the spray-on fibre protective compositions used in the prior art.

Furthermore, the geopolymers can be adapted in a manner to form even thickness coatings on substrates and provide a more aesthetically pleasing outcome than the spray-on fibre protective approach. Geopolymers are also simpler to work with and manipulate than the spray-on fibre approach.

The use of the geopolymer described in accordance with the present invention as a mortar may be as an alternative for OPC. A geopolymer provides a strong, rapidly curing mortar. The use of a curable geopolymer foam rather than a non-foamed material as a mortar also reduces the mass of material to be used. This establishes lower cost implications for using a geopolymer foam.

A disadvantage of OPC is its high thermal conductivity, which mitigates against moves to improve the energy use of buildings through heating. Thin joint mortar, whilst reducing thermal conductivity overall still has the disadvantage of use of an essentially highly conductive material. In thin joint mortar systems, there is a need for very accurate blocks and precise levelling.

The geopolymer may be dispensed via a nozzle gun arrangement making its distribution on surfaces to be bound, tidier, simpler and more accurate by dragging a nozzle ejecting the foam along the surface as desired. Where the geopolymer is a foamed geopolymer, once the geopolymer is applied to the surface to be bound (e.g., a brick surface), the other surface to be bound is brought into contact such that during the curing process the geopolymer expands (by action of the blowing/foaming agent) and cures to fill the space between the two surfaces and bind them.

The geopolymer of the present invention is able to cope with less even block surfaces than thin joint mortar systems whilst still using less material.

Geopolymers in general have very low embodied carbon dioxide and as such have an inherently lower environmental impact over the current prior art materials used in the conventional coating and mortar applications. Additionally, unlike OPC, mineral polymers can be recycled.

As used in the present invention, the term "geopolymer" is intended to represent a member of a class of synthetic aluminosilicate polymeric materials, which may also be referred to as mineral polymers. The geopolymers are formed by reacting, for example via dissolution, an aluminosilicate in an alkaline silicate solution or an acidic medium, which upon condensation (curing) forms a mouldable, homogeneous polymeric product. Blowing (foaming) agents can be added to form a foamed geopolymeric material. Fibres, such as mineral, glass, synthetic and natural fibres, can be added to the reaction mixture to impart various physical properties, such as improved strength.

Advantageously, the raw materials for the preparation of mineral polymers are readily available on a worldwide basis and in non-conflict areas. They are not based on materials that are in limited supply, thus production is not very susceptible to fluctuations and to higher prices.

In some embodiments, the geopolymer may be a foamed geopolymer. Alternatively, the geopolymer may be a non-foamed geopolymer.

In the context of the present invention, the person skilled in the art will understand what is meant by a material which is a foamed and non-foamed geopolymer. However, by way of example, a foamed substance or material is a substance (e.g., a particle or a mass) that is formed by trapping pockets of gas in a solid (e.g. by blowing a gaseous agent (blowing agent) into a hardenable (curable) material (molten, paste or fluid) thereby creating a foamed geopolymer upon hardening to a solid). As a result, a proportion of the internal volume of a foamed substance is a gas such that the density of the substance can be varied by altering the volume of the entrapped gas and/or the type of the gas. It is generally accepted that the lower the content of the entrapped gas the greater the density of the solid and vice versa. A foamed material will typically contain a network of gaseous voids (e.g. cells, pockets etc.) throughout its volume (matrix or structure) which may take an open- or closed-cell arrangement or configuration.

Alternatively, pockets, cell or voids of gas in a solid can be created by virtue of adding a filler that already contains pockets, cells or voids i.e. incorporates already trapped gaseous materials. It is within the scope of the present invention that fillers can be used to incorporate voids in order to create the effect of a geopolymer foam. By way of example, fillers can be glass microspheres, aerogels, aeroclays, pearlite or vermiculite etc. which are able to incorporate voids into the geopolymer matrix by virtue of the presence of voids within the glass microspheres, aeroclays, pearlite or vermiculite etc.

In accordance with the present invention, the geopolymer may be a foamed geopolymer. The foamed material will preferably have greater than 10%, and preferably over 40% and preferably over 50% of its internal volume consisting of gaseous voids.

Preferably, the foamed material will have between about 40% and 65% or more, or between about 40% and 70% or more of its internal volume consisting of gaseous voids.

Preferably, in accordance with the present invention, the use of a geopolymer in a coating composition for a building construction component is as a sprayable geopolymer. Likewise, the same applies for the coated component and method of coating a component in accordance with the invention.

A mortar is a material that can be used to bind construction blocks together, such as bricks, stones, tiles and concrete, calcium silicate or cinder blocks.

In some embodiments, the geopolymer may be prepared from a curable mixture comprising about 15% to about 35% by weight of a metakaolin. The curable mixture may comprise up to about 30% by weight of a muscovite mica. The curable mixture may comprise about 20% to about 55% by weight of an aqueous alkali metal silicate solution, the solution comprising 15 to 45% by weight of alkali metal silicate. The curable mixture may comprise about 1% to about 20% by weight of an alkali metal hydroxide. The curable mixture may optionally comprise about 0.01% to about 5% by weight of a blowing agent.

The geopolymers used in accordance with the present invention may include a fibrous material. Suitable fibrous materials include, but not limited to, organic fibres such as cellulosic fibres, inorganic fibres such as metal-based fibres and silicon-based glass fibres. The fibrous re-enforcement material may be a fibre mesh layer or individual fibres. The fibres may be present at amounts of between 4 and 20% by weight of the cured geopolymer. The fibres may be present in the foams at amounts of between 0 and 10% by weight of the cured geopolymer.

Preferably, the geopolymer has a density of between 0.1 to 1.8 g/cm$^3$. The geopolymer may have a density of between 0.1 to 0.9 g/cm$^3$.

The geopolymer used in accordance with the present invention may be prepared from a curable mixture comprising about 15-35% by weight of a metakaolin, about 15-30% by weight of a muscovite mica, about 20-55% by weight of an aqueous alkali metal silicate solution (with 15 to 45% by weight of alkali metal silicate), about 1-20% by weight of an alkali metal hydroxide, and optionally about 0.01-5% by weight of a blowing (foaming) agent, up to 100% by weight, which may include the inclusion of one or more fibrous materials.

Preferably, the geopolymer used in accordance with the present invention may be prepared from a curable mixture comprising about 20-30% by weight of a metakaolin, about 20-30% by weight of a muscovite mica, about 35-50% by weight of an aqueous alkali metal silicate solution (with 15 to 45% by weight of alkali metal silicate), about 1-10% by weight of an alkali metal hydroxide, and optionally about 0.01-5% by weight of a blowing (foaming) agent, up to 100% by weight, which may include the inclusion of one or more fibrous materials.

The geopolymer may be prepared from a curable mixture comprising about 18-25% by weight of a metakaolin; about 18-25% by weight of a muscovite mica; about 30-40% by weight of an aqueous alkali metal silicate solution (with 15 to 45% by weight of alkali metal silicate); about 5-11% by weight of an alkali metal hydroxide; and optionally about 1-3% by weight of the blowing agent, up to 100% by weight, which may include the inclusion of one or more fibrous materials.

Preferably, the geopolymer may be prepared from a curable mixture comprising about 23-28% by weight of a metakaolin; about 22-27% by weight of a muscovite mica; about 40-45% by weight of an aqueous alkali metal silicate solution (with 15 to 45% by weight of alkali metal silicate); about 5-10% by weight of an alkali metal hydroxide; and optionally about 0.1-3% by weight of the blowing agent, up to 100% by weight, which may include the inclusion of one or more fibrous materials.

The geopolymer may be prepared from a mixture comprising about 21.6% by weight of a metakaolin; about 20.57% by weight of a muscovite mica; about 35.2% by weight of an aqueous alkali metal silicate solution (with about 34% by weight of alkali metal silicate); about 8.5% by weight of potassium hydroxide; and about 1.9% by weight of the blowing agent, and about 2% of a fibrous material.

Preferably, the geopolymer is prepared from a mixture comprising about 25% by weight of a metakaolin; about 24% by weight of a muscovite mica; about 41.5% by weight of an aqueous alkali metal silicate solution (with about 29% by weight of alkali metal silicate); about 8% by weight of potassium hydroxide; and optionally about 0.5% by weight of the blowing agent.

It is also understood in accordance with the present invention that, where appropriate, the amounts up to 100% by weight may be made up of one or more other constituent(s) such as water. Such constituent(s) may or may not have a material effect on the functionality of the resultant geopolymer.

Preferably, the alkali metal silicate is potassium silicate or sodium silicate, most preferably potassium silicate. Preferably, the alkali metal hydroxide is potassium hydroxide. Mixtures of the alkali metal silicate and alkali metal hydroxide with different cations may be used (e.g., NaOH/KOH). Preferably, the metakaolin is a calcined metakaolin. Most preferably, a metakaolin milled to a fine powder and flash calcined at approximately 750° C.

A blowing agent, also referred to as foaming agent or gaseous agent, is typically used in the preparation of the foamed geopolymer used in accordance with the present invention. This may be any blowing agent suitable in the preparation of geopolymeric materials including hydrogen peroxide, calcium oxide, mixtures of hydrogen peroxide and calcium oxide, aluminium powder or zinc powder and other light metal powders.

Preferably, the blowing agent is used in the preparation of the geopolymer foam at 0.01-5% by weight. The blowing agent may be present in an amount 0.1-2% by weight, and preferably at 0.1-0.5% by weight of a curable mixture for preparing the foam.

In some embodiments, the blowing agent may be a wet blowing agent such as hydrogen peroxide. The blowing agent may be present in an amount 0.5-5% by weight, or preferably at 1-3% by weight of a curable mixture for preparing the foam.

In alternative embodiments, the blowing agent may be a dry blowing agent such as aluminium powder or zinc powder. The blowing agent may be present in an amount 0.01-2% by weight, and preferably at 0.01-0.1% by weight of a curable mixture for preparing the foam.

The use of a blowing agent at these amounts as a foaming agent, as well as imparting foaming attributes, also assists in the rapid but controlled curing of the geopolymeric foam at ambient temperatures (e.g. between 0 to 30° C.), consistent with those routinely experienced in a typical building construction site. Specifically, when a blowing agent such as aluminium powder comes into contact with the liquid alkali constituent of the foamed geopolymer preparation mixtures, heat and hydrogen gas are formed. The heat facilitates the rapid dissolution of the metakaolin constituent of the reaction mixture and thus assists the fast curing of the geopolymer, while the hydrogen gas acts as the blowing gas to impart the foamed feature of the geopolymer foam.

The geopolymer in accordance with the present invention may further comprise up to 55% by weight of a filler.

For example, the geopolymer may be prepared from a curable mixture comprising about 15-35% by weight of a metakaolin, up to 30% by weight of a muscovite mica, up to 55% by weight of a filler, about 30-40% by weight of an aqueous alkali metal silicate solution (with 15 to 45% by weight of alkali metal silicate); about 1-20% by weight of an alkali metal hydroxide, up to 100% by weight, which may include one or more fibrous materials.

The geopolymer may be prepared from a curable mixture comprising about 20-30% by weight of a metakaolin, about 20-30% by weight of a muscovite mica, about 35-55% by weight of a filler, about 30-40% by weight of an aqueous alkali metal silicate solution (with 15 to 45% by weight of alkali metal silicate); about 1-10% by weight of an alkali metal hydroxide, up to 100% by weight, which may include one or more fibrous materials.

In some embodiment, preferably where the geopolymer is provided for use in a coating composition, a coated component or in a method of coating a component, the geopolymer may be prepared from a curable mixture comprising about 18-25% by weight of a metakaolin; about 18-25% by weight of a muscovite mica; about 30-40% by weight of a filler, about 30-40% by weight of an aqueous alkali metal silicate solution (with 15 to 45% by weight of alkali metal silicate); about 5-11% by weight of an alkali metal hydroxide; and optionally about 1-3% by weight of the blowing agent, up to 100% by weight, which may include one or more fibrous materials.

The geopolymer may be prepared from a curable mixture comprising about 23-28% by weight of a metakaolin; about 22-27% by weight of a muscovite mica; about 40-45% by weight of a filler, about 30-40% by weight of an aqueous alkali metal silicate solution (with 15 to 45% by weight of alkali metal silicate); about 5-10% by weight of an alkali metal hydroxide; and optionally about 0.1-3% by weight of the blowing agent, up to 100% by weight, which may include one or more fibrous materials.

The geopolymer may be prepared from a mixture comprising about 25% by weight of a metakaolin; about 24% by weight of a muscovite mica; about 41.5% by weight of a filler, about 30-40% by weight of an aqueous alkali metal silicate solution (with 15 to 45% by weight of alkali metal silicate); and about 8% by weight of potassium hydroxide.

The geopolymer may be prepared from a mixture comprising about 21.6% by weight of a metakaolin; about 20.57% by weight of a muscovite mica; about 41.5% by weight of a filler, about 30-40% by weight of an aqueous alkali metal silicate solution (with 15 to 45% by weight of alkali metal silicate); and about 8.5% by weight of potassium hydroxide.

The filler of the geopolymer of the present invention can be selected from any material which material already contains pockets, cell or voids of gas or gaseous material. By way of example such fillers include glass microspheres, aeroclays, aerogels, pearlite, vermiculite etc.

It is intended that the geopolymer comprising a filler will be used as a coating composition for building materials.

It is also intended that the geopolymer comprising a filler will be used in building construction.

It is further intended that the geopolymer comprising a filler is to be used as a coating composition for coating a component such as a building component.

It is also further intended that the geopolymer comprising a filler is to be used as a coating composition for coating a component such a mortar.

Preferably, the building construction component may be, but not limited to, a metallic component. Further, the building construction component may be, but not limited to, a girder, door frame, window frame, lift shaft wall, utility conduit, water or gas pipe, support beam or column, or other structural component of a building.

Preferably, in accordance with the method of the present invention, applying the curable geopolymer mixture is by a spraying technique. To apply the curable geopolymer used in accordance with the invention, the curable mixture may be prepared with manual mixing of the mixture constituents by a site worker in a conventional manner, or else the curable mixture may be prepared within a specially designed applicator and applied to a surface to be coated through a bespoke nozzle spray arrangement.

The curable geopolymer mixture should be viscous enough to be retained on the coating surface while it cures.

Where the geopolymer of the present invention is a foamed geopolymer, the expanding nature of the applied foam advantageously allows joints to be built using more irregular blocks than possible by traditional OPC-based thin joint mortars.

In some embodiments, preferably where the geopolymer is provided for use as a mortar, the geopolymer may be prepared from a curable mixture comprising about 10-35% by weight of a metakaolin. The mixture may comprise about up to 30% by weight of a muscovite mica. The mixture may comprise about 10-50% by weight of an aqueous alkali metal silicate solution (with 20 to 50% by weight of alkali metal silicate). The mixture may comprise about 5-25% by weight of an alkali metal hydroxide. The mixture may comprise about 0.01-2% by weight of a blowing (foaming) agent. The mixture may comprise about 0-40% by weight of additional fillers, made up from including but not limited to, perlite, wollastonite, basalt, cordierite, talc and starch.

The geopolymer used may be prepared from a curable mixture comprising about 17.8% by weight of a metakaolin (e.g. Powerpozz—Newchem Ltd), about 21.5% by weight of a muscovite mica (e.g. grade MD150—LKAB), about 29.8% by weight of an aqueous alkali metal silicate solution (with 34% by weight of alkali metal silicate), about 16.7% by weight of an alkali metal hydroxide, and optionally about 0.06% by weight of an aluminium powder blowing (foaming) agent, and up to 100% by weight, which may include the inclusion of one or more fillers, made up from e.g. perlite (about 1%), wollastonite (about 3.2%) and/or the inclusion of about 0.4% of additional thickeners such as soluble starch.

The geopolymer may be prepared from a curable mixture comprising about 17.8% by weight of a metakaolin (e.g. Powerpozz—Newchem Ltd), about 21.5% by weight of a muscovite mica (e.g. grade MD150—LKAB), about 29.8% by weight of an aqueous alkali metal silicate solution (with 34% by weight of alkali metal silicate), about 7.51% by weight of an alkali metal hydroxide, and optionally about 0.06% by weight of an aluminium powder blowing (foaming) agent, and up to 100% by weight, which may include the inclusion of one or more fillers, made up from e.g. perlite (about 1%), wollastonite (about 3.2%) and/or the inclusion of about 0.4% of additional thickeners such as soluble starch.

It will be understood by those skilled in the art that where appropriate, the amounts up to 100% by weight may be made up of one or more other constituent(s), for example, water.

In some embodiments, the geopolymer of the present invention may be provided in two parts which react upon mixing. This allows it to be prepared in advance and applied when required.

According to the invention, there is provided a kit for preparing a geopolymer as herein described. The kit may further comprise one or more building construction components as herein described.

The kit of parts may comprise two or more parts, and each part may comprise one or more constituents for preparing a geopolymer.

Preferably, the first part may comprise one or more of the following constituents from the list consisting: aqueous alkali metal silicate solution, alkali metal hydroxide, mica, additional filler(s) and soluble starch. The amounts up to 100% by weight may be made up of one or more other constituents for example, water.

Preferably, the second part may comprise one or more of the following constituents from the list consisting: metakaolin, additional filler(s) and a blowing agent. The amounts up to 100% by weight may be made up of one or more other constituent(s), for example, water.

The kit may further comprise instructions for preparing a geopolymer according to the present invention as herein described and may instruct the use of the geopolymer as a coating composition for a building construction component, the method of coating a component by applying the curable geopolymer mixture to the surface of the component and/or use of the geopolymer as a mortar.

In one embodiment of the invention, the first part may comprise about 48% by weight of an aqueous alkali metal silicate solution (with 16.7% by weight of alkali metal silicate), about 13.1% by weight of an alkali metal hydroxide, about 35.5% by weight of a muscovite mica (MD-150—LKAB), about 1.6% of an additional filler (for example made up from but not limited to perlite), and about 0.65% of soluble starch.

The second part may comprise about 45.3% by weight of metakaolin (Powerpozz—Newchem Ltd), about 8% by weight of one or more fillers (made up from but not limited to wollastonite (MW75 and MW250—LKAB), and about 0.15% by weight of an aluminium powder blowing (foaming) agent, and the inclusion of about 46.5% of water.

BRIEF DESCRIPTION OF THE DRAWINGS

The present invention is now described with reference to the Figures of the accompanying drawing as follows.

A specific embodiment in accordance with the present invention is now described with reference to the diagrams of FIG. 2.

Figure 2:
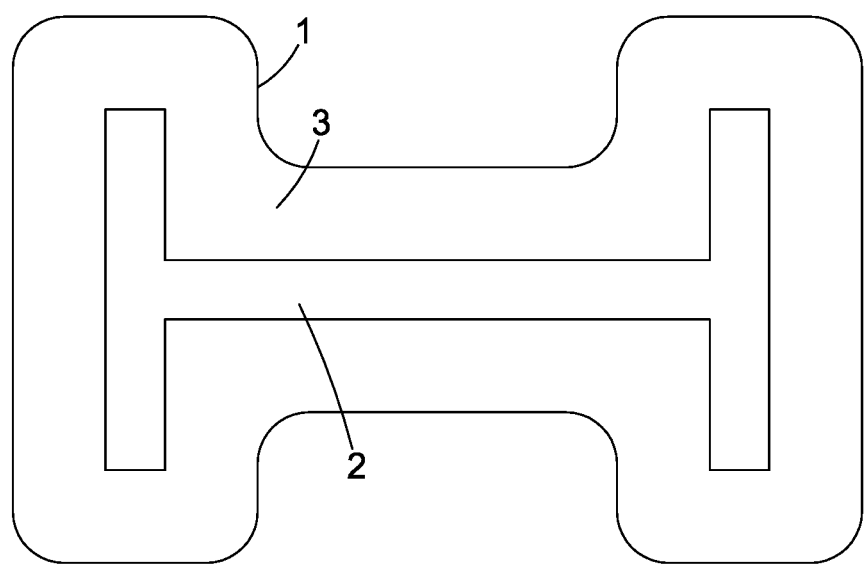
FIG. 2 is a cross-sectional representation of a geopolymer foam-coated building element in accordance with the present invention.

With reference to the diagram of FIG. 2, there is shown a cross-section of a geopolymer foam-coated "I" section structural steel member 1 suitable for use as a support member (such as a support beam) in a building. Coated member 1 has an uncoated steel member 2 with a geopolymer foam coating 3 thereon.

Figure 1A:
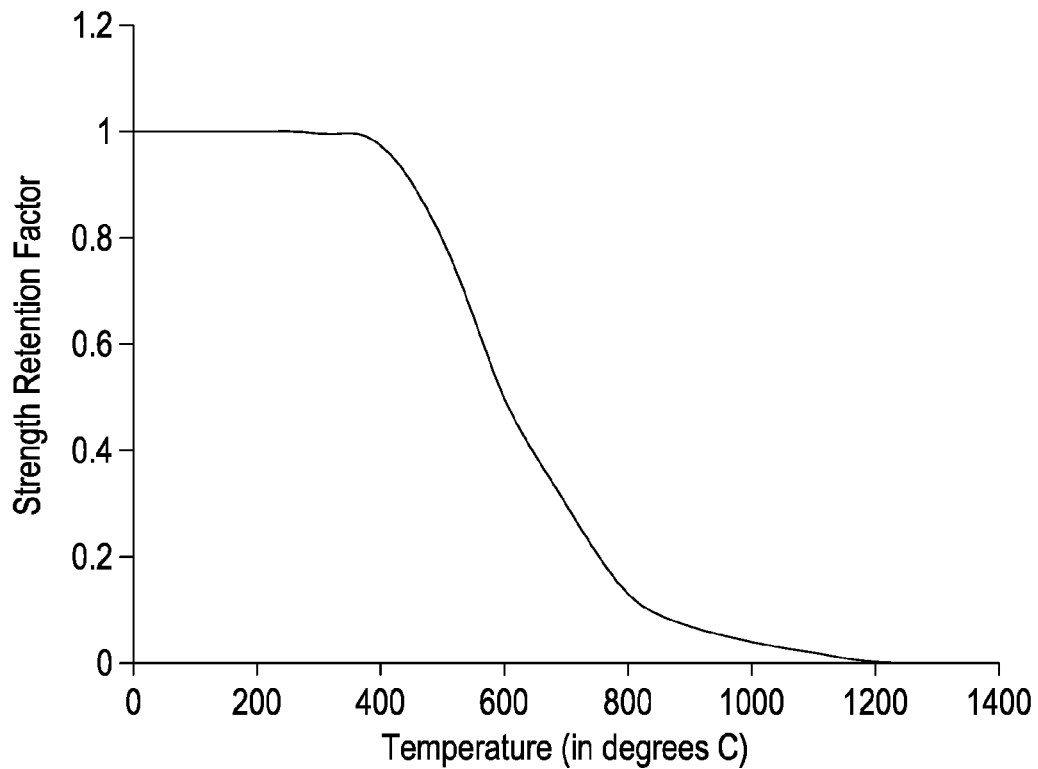
FIG. 1a is a graph indicating the temperature-related weakening of steel as a function of temperature in degrees Celsius versus Strength Retention Factor.
Figure 1B:
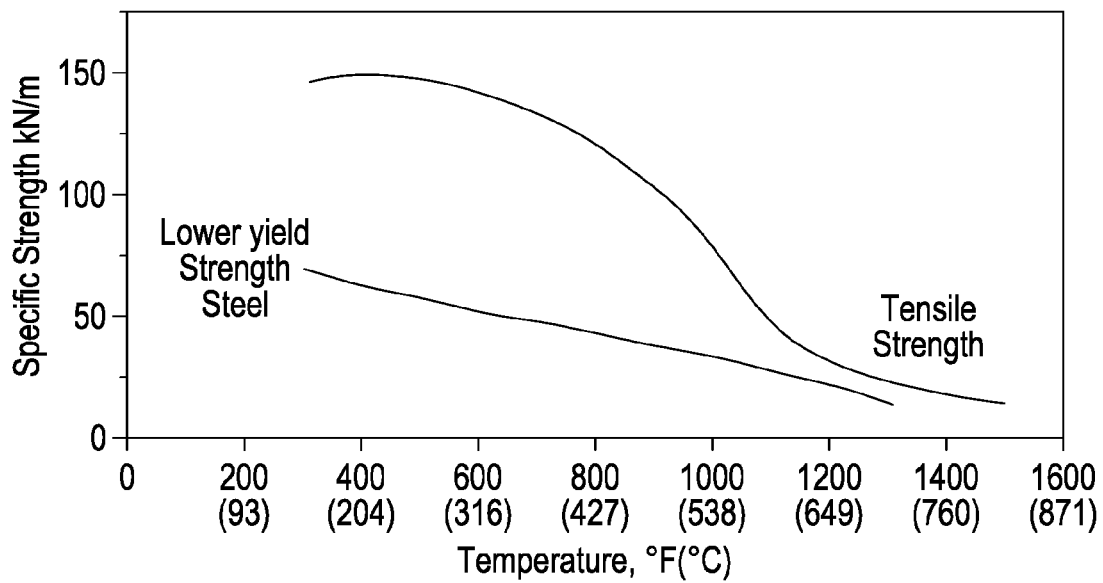
FIG. 1b is a graph indicating the yield strength and tensile strength of plain carbon steel (SA-192) as a function of temperature.

Coating 3 may be applied to uncoated steel member 2 (e.g., by spraying a curable geopolymer foam composition) either in situ at a building construction site by a site worker. Otherwise, coated member 1 may be pre-fabricated off-site and subsequently brought to and positioned at the building construction site as required. Coating 3 forms a fixed fireproofing and heat-resistant layer for steel member 2 which increases the heat-up time for steel member 2 during a fire. This prolongs the period where the structure of steel member 2 remains intact and thus when a building supported by steel member 2 may remain stable (see earlier discussion in relation to the graph of FIGS. 1a and 1b).

Prior to application to steel member 2, the curable geopolymer foam composition is prepared as follows. Percentage by weight amounts are applicable to the whole of the curable composition.

In a suitable container (5 L), to a bulk dry mixture consisting of 25% by weight of metakaolin (Argical-M 1200S, AGS Minéraux) calcined at approximately 750° C.; 24% by weight of a muscovite mica (Imerys M814, Imerys) and 0.35% by weight of aluminium powder (200 mesh (75 micron), Sigma-Aldrich) is added a liquid aqueous mixture consisting of 42.5% by weight of a 29% by weight aqueous potassium silicate solution (Crosfield K66) with 8.15% by weight of potassium hydroxide dissolved therein.

Alternatively, in a suitable container, to a bulk dry mixture consisting of about 22% by weight of metakaolin (Argical-M 1200S, AGS Minéraux) flash calcined at approximately 750° C.; about 21% by weight of a muscovite mica (Imerys M814, Imerys) and about 1.3% of cellulosic fibres added a liquid aqueous mixture consisting of 35.2% by weight of a 34% by weight aqueous potassium silicate solution (Crosfield K66) with 8.5% by weight of potassium hydroxide dissolved therein. Finally about 2% by weight of hydrogen peroxide (100 Vol) is added just prior to application.

The mixture is stirred rapidly by manual stirring means to evenly distribute the dry mixture constituents with the aqueous liquid constituents. As the onset of geopolymer curing and foaming is immediate, the mixture increases in viscosity to a level suitable for application by spraying on to the surface of uncoated steel member 2.

A further specific embodiment in accordance with the present invention is now described with reference to FIG. 3.

Figure 3:
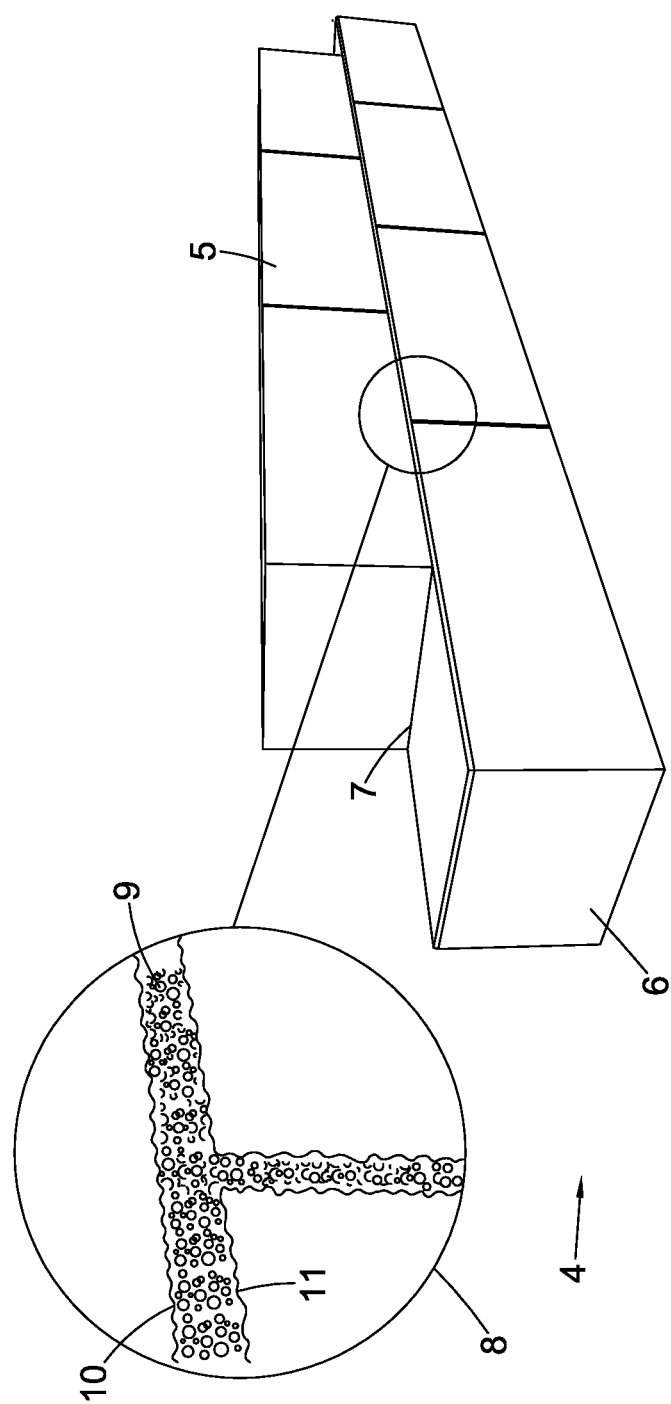
FIG. 3 is a diagrammatic representation of a wall using a geopolymer mortar defined in accordance to the present invention.

At FIG. 3, there is a wall 4 made up of clay bricks 5 stacked vertically on top of one another. Wall cross-section 6 shows interfaces 7 between clay bricks 5. At panel 8, there is shown a magnified portion of wall cross-section 6 wherein geopolymer foam 9 prepared as outlined above for FIG. 2 has been applied between upper surface 10 and lower surface 11 of clay bricks 5, whereupon curing of geopolymer foam 9, a strong bond between bricks 5 is established.

The use of the geopolymer foam as a mortar allows the much closer fitting of blocks (such as bricks) than using a conventional mortar (e.g., OPC). When constructing a structure such as wall 4, the mortar is applied to a lower brick and then the next brick is fitted. The mortar expands to fill surface irregularities on the block and provides a very close bonding to the block. The thickness of the applied mortar can thus be substantially less than using a conventional mortar, thus saving on the weight of mortar material taken up the building/structure and consequently cost. Moreover, the application and building time is considerably less than using OPC. The use of a dispenser for the application of the geopolymer foam mortar enables faster application of the mortar to brick/block surfaces and the more rapid setting (curing) of the geopolymer foam mortar enables a greater height of wall or other structure to be built in a shorter period of time than by using a conventional mortar.

REFERENCES

1. "*Nalco Company: Nalco Guide to Boiler Failure Analysis*" (2011), Second Edition. Short-Term Overheating, Access Engineering, McGraw-Hill Professional.

The invention claimed is:
1. A method of binding adjacent building components together comprising the steps:
 a) applying a curable geopolymer foam mixture to a surface of a first construction component, wherein the curable geopolymer foam mixture comprises:
  about 10% to about 35% by weight of a metakaolin;
  up to about 30% by weight of a muscovite mica;
  about 10% to about 50% by weight of an aqueous alkali metal silicate solution, the solution comprising 20 to 50% by weight of alkali metal silicate;
  about 5% to about 25% by weight of an alkali metal hydroxide; and
  optionally up to 40% by weight of additional fillers;
 b) placing a second construction component adjacent to the first construction component, wherein the applied curable geopolymer foam mixture is between the first and second construction components; and c) curing the curable geopolymer foam mixture to form a cured foamed geopolymer which binds the first and second construction components together.

2. The method according to claim 1, wherein the curable geopolymer foam mixture is prepared from a curable mixture comprising:

about 17.8% by weight of a metakaolin;
about 21.5% by weight of a muscovite mica;
about 29.8% by weight of an aqueous alkali metal silicate solution (with about 34% by weight of alkali metal silicate);
about 16.7% by weight of an alkali metal hydroxide; and optionally about 0.06% by weight of a blowing agent.

3. The method according to claim 1, wherein the cured foamed geopolymer has a density of 0.1 to 1.8 g/cm3.

4. The method according to claim 1, comprising a blowing agent in the mixture at 0.01-2% by weight.

* * * * *